May 27, 1941.   G. A. ELLESTAD   2,243,375
WRAPPED CONFECTION
Filed July 19, 1939   2 Sheets-Sheet 1

Inventor
Gerhard A. Ellestad
By
Williams, Bradbury, McCaleb & Hinkle
Attys

May 27, 1941.  G. A. ELLESTAD  2,243,375
WRAPPED CONFECTION
Filed July 19, 1939  2 Sheets-Sheet 2
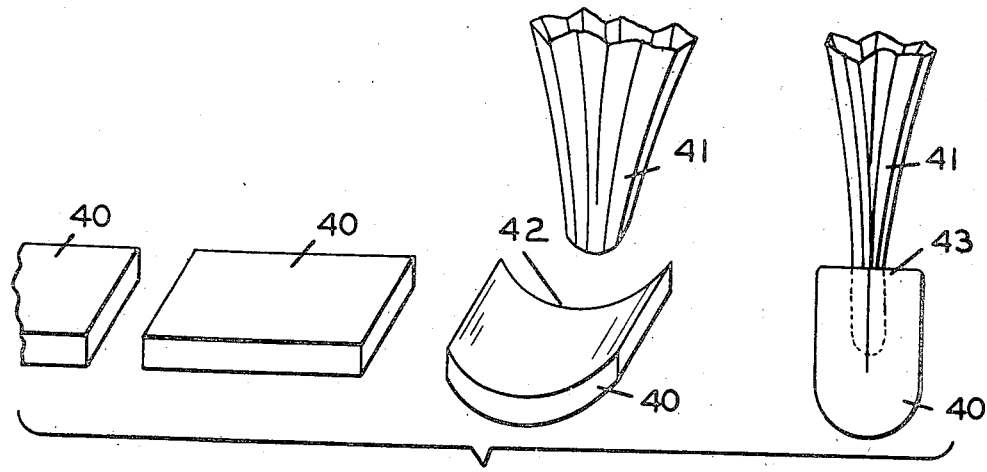
FIG. 8
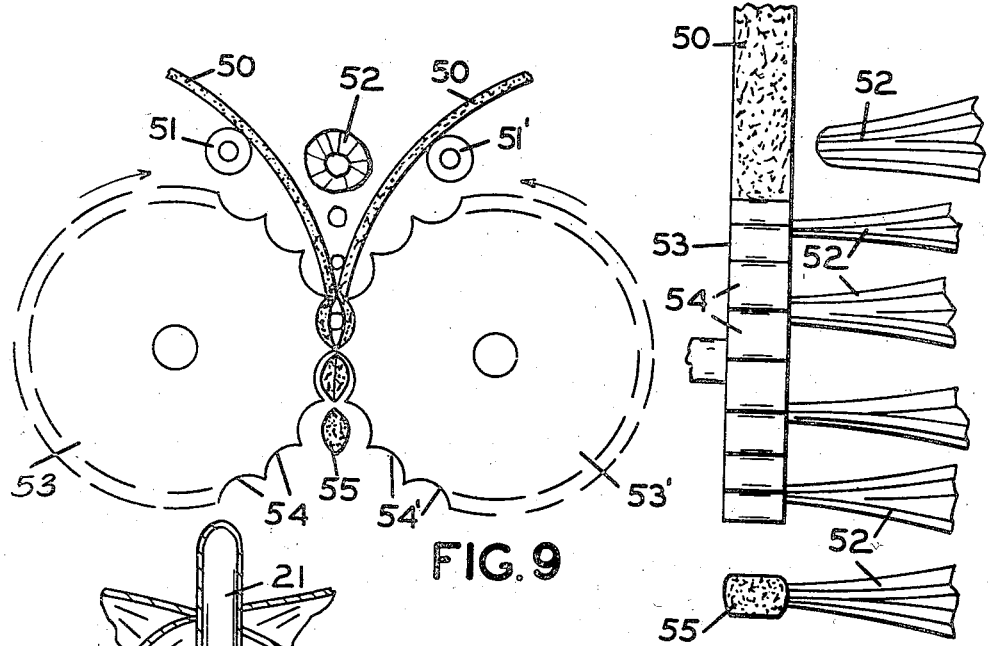
FIG. 9
FIG. 10
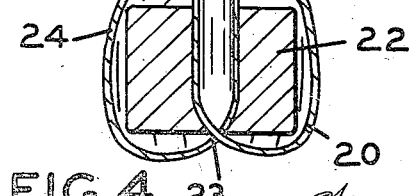
FIG. 4
Inventor
Gerhard A. Ellestad
By
Williams, Bradbury, McCaleb & Hinkle
Attys.

Patented May 27, 1941

2,243,375

UNITED STATES PATENT OFFICE 2,243,375

WRAPPED CONFECTION

Gerhard A. Ellestad, Rochester, N. Y., assignor to Saf-T-Pop Corporation, Dubuque, Iowa, a corporation of Delaware Application July 19, 1939, Serial No. 285,358

3 Claims. (Cl. 99—180)

This invention relates to confections and methods and apparatus for making the same and, more particularly, it has reference to confections having handle means for supporting the confection during consumption.

Under the generally prevailing practice of the prior art, confections, such as lollipops, for example, are made by inserting a relatively long rigid handle member into a piece of relatively soft, plastic candy so that when the candy hardens the handle will be firmly embedded therein. Such handle members are usually in the form of long wooden sticks and, since lollipops are largely consumed by children, such wooden stick handles are very apt to, and often do, cause serious bodily injury. Thus, for example, a child with a lollipop in its mouth may fall so that the stick is pushed into the roof of the mouth or down the throat and the resulting injury is, of course, greatly increased if the stick should break and form sharp splinters. Furthermore, when wooden stick handles are used it is frequently difficult to firmly bond a relatively smooth stick to a mass of candy. The usual lollipops of the prior art are generally enclosed in paper or cellulosic wrappers to protect the candy from contamination, but difficulty is sometimes experienced in keeping the wrappers in place until the candy is to be consumed.

One of the objects of my invention is to provide an improved confection having a safety handle. A further object is to provide an improved confection having secured thereto a sheet material member which will provide safety handle means and also an enclosing wrapper. Another object is to provide an improved method and means for attaching handle members to confections. Still another object is to provide method and means for attaching sheet material handle members to confections. A still further object is to provide method and means for attaching combined handle members and enclosing wrappers to confections. These and other objects and advantages reside in certain novel features of construction, arrangement and combination of parts and in the methods of constructing, arranging and combining them, all as will hereinafter be more fully explained and pointed out in the appended claims.

Referring to the drawings:

Fig. 4 is a similar view of still another modification.

Fig. 8 illustrates another method of attaching handle members to a confection.

Fig. 9 illustrates a further method of attaching handle members to confections.

Fig. 10 is a side view of the apparatus shown in Fig. 9.

Figure 1:
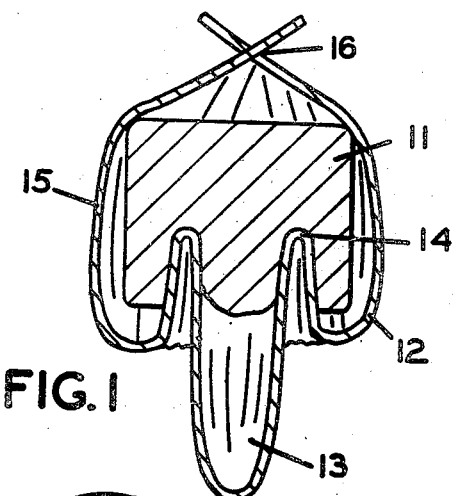
Fig. 1 shows a sectional view of a confection embodying my invention.

One preferred embodiment of my confection is shown in Fig. 1 wherein 11 indicates a mass of candy having embedded therein a portion of a sheet material member 12. The member 12 has a pocket or tubular shaped portion 13 which projects outwardly from the candy so as to form a handle for holding the confection during consumption. The tubular portion 13 terminates in a reversely formed part 14 from which the remaining part 15 of the sheet material member extends outwardly and is then brought around the candy 11 and twisted, as at 16, so as to provide an enclosing wrapper for the candy, as clearly shown in Fig. 1. When the candy is to be consumed, the wrapper part 15 is untwisted and brought downwardly in a flared out position so as to expose the candy, the candy is held by handle portion 13 and the flared out wrapper portion will prevent candy particles from soiling the hand which holds the confection.

Figure 2:
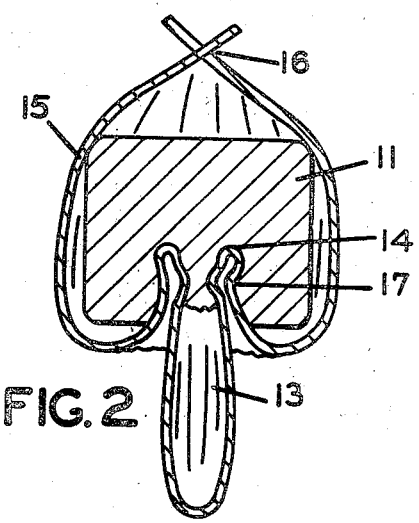
Fig. 2 is a similar view of a modification.

In the modification shown in Fig. 2 the portion of the sheet material member 12 has a reduced formation 17 adjacent the reversely formed part 14 so as to provide a kind of head on the end of the part 13 and thereby provide means for more firmly anchoring the sheet material member to the candy.

The sheet material member 12 may be formed of any suitable material such as paper, cloth, metallic foil or the like. The material should, of course, be such that there will be no deleterious effects produced upon either the candy or the sheet material. I have found that certain types of cellulosic sheet material such as sold under the trade-names "Kodapak" and "Cellophane" may be used successfully and that sheet material made of crude rubber and sold under the trade-name "Pliofilm" may also be used. I do not, of course, limit my invention to the use of these materials as it is obvious that other sheet materials having the proper characteristics may also be used. The sheet material used should be flexible and relatively tough so as not to crack or fracture and should preferably be impervious to moisture. The material should also be such that a relatively rigid handle member, sufficient to hold the candy, will be provided. Strength and rigidity will, of course, be imparted to the handle part 13 by virtue of its shape and/or the folds or creases in its walls. It will be obvious that handle members of sheet material will not cause bodily injury to children and that the wrappers cannot accidentally get loose and fall off before the candy is consumed as the wrapper-handle member is firmly attached to the candy.

Figure 3:
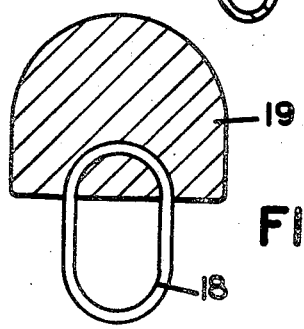
Fig. 3 is a similar view of a further modification.

The modification of Fig. 3 shows another type of safety handle embedded in a confection. In this form a sheet material handle is not used but, instead, the handle 18, embedded in candy 19, is made of a rigid material such as wood, metal, molded plastics or the like. The handle, however, is not formed as a relatively long pointed member like a stick, but has a sort of closed, ring shape with spaced sides connected by easy curved parts so that no sharp portions are produced. Such a handle may be of circular or oval shape and it may be split with the two ends closely spaced and embedded in the candy. Such a handle will be safer than a long wooden stick handle since a relatively sharp penetrating point would be absent and fracturing and splintering would be minimized.

The modification of Fig. 4 has a sheet material member 20 having a tubular handle portion 21 embedded in and extending through the candy 22. At the base of the tubular portion 21, the sheet material is twisted as shown at 23 and the remaining part 24 of the sheet material member is brought up around the candy and twisted around the handle part 21, thereby providing an enclosing wrapper for the candy. When the candy is to be consumed, the wrapper part 24 is untwisted and turned down, so as to expose the candy, and may then be torn off near the twist at 23 where the sheet material member is preferably scored or weakened so as to facilitate tearing.

Figure 5:
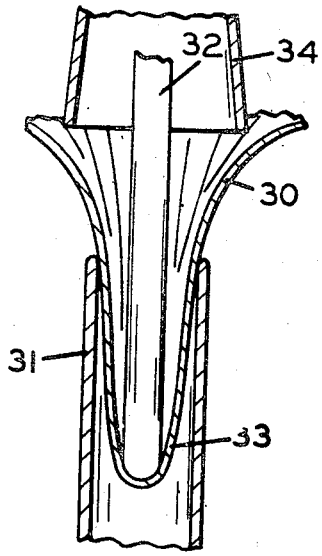
Figs. 5, 6 and 7 illustrate, diagrammatically, a method of attaching a combined handle and wrapper member to form the confection in Fig. 1.
Figure 6:
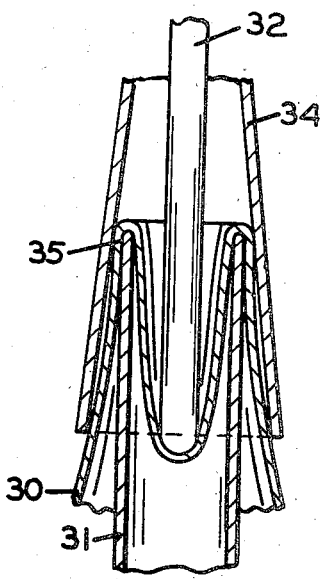
Figure 7:
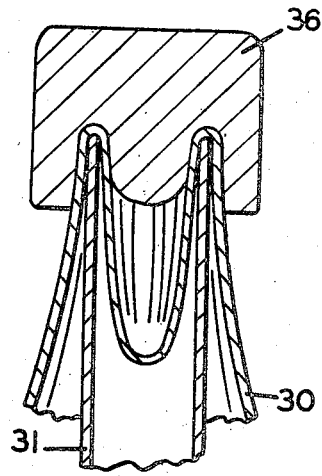

In Figs. 5-7, I have illustrated the steps of a method for attaching a sheet material handle member to a piece of candy to produce the confection of Fig. 1. In this method, a piece of sheet material 30 is positioned with its center over the end of an open tube 31. A reciprocating, coaxial rod 32 then forces the sheet material partially down into the tube so as to make a pocket 33 thereof, after which, a centrally disposed conical member 34 moves down over the tube 31 so as to form a reversely directed part 35 as shown in Fig. 6. The rod 32 and cone 34 are then withdrawn and the tube 31 with the sheet material on its end is then forced into a plastic mass of candy 36 as shown in Fig. 7. The tube is withdrawn, the candy 36 is pressed between dies and the extending part of the sheet material is then wrapped around the candy to provide the article of Fig. 1.

In Fig. 8 there are illustrated the various steps of another method for attaching safety handles to a plastic mass of candy. In this method, the flat pieces of plastic candy 40 are cut off from a strip. A handle member 41 is brought into juxtaposition with a piece of plastic candy 40 and the latter is then folded up on itself as indicated at 42 so as to enclose the end of handle member 41 and thereby provide the finished product shown at 43. The handle member 41 shown in Fig. 8 is made of flexible sheet material and is of the type disclosed in my United States Patent Number 2,096,611 issued October 19, 1937. It is, of course, obvious that the method of Fig. 8 could also be used for attaching the sheet material handle of the forms shown in Figs. 1 and 2. It is also apparent that this method could be successfully employed for attaching the closed ring-shape solid handle to a plastic mass of candy to provide a lollipop as shown in Fig. 3.

In Figs. 9 and 10 there is illustrated a still further method of attaching handles to plastic candy masses. In this method, two oppositely positioned strips of plastic candy 50 and 50' are fed downwardly into converging relationship over the rollers 51 and 51' respectively. Handle members such as at 52, for example, are fed downwardly, in spaced relation, between the strips of plastic candy so that portions of the handle members are embedded in plastic candy when the two strips 50 and 50' are squeezed together by the action of the two driven rollers 53 and 53' as clearly shown in Fig. 9. The faces of the rollers 53 and 53' have cooperating pairs of recesses or pockets 54 and 54' which serve to shape the plastic candy about the handle member 52 and sever the shaped pieces 55 from the strips. The rollers 53 and 53' have the same dimensions and are rotated at the same speeds but in opposite directions—roller 53 being driven in a clockwise direction and roller 53' in a counterclockwise direction.

Although I have shown, in Figs. 9 and 10, the application of the method for attaching one type of handle member to plastic masses of candy, it will be obvious that other types of handle members can also be successfully attached to plastic candy by this method. Thus, sheet material handle members such as are used in the confections disclosed in Figs. 1 and 4 could be attached by this method. The ring shaped handle member 18 shown in Fig. 3 could be embedded in plastic candy by the method shown in Figs. 9 and 10. Various other types of handles could obviously be attached to plastic candy by this method.

From the foregoing it will be apparent that I am able to provide an improved confection having a safety handle; to provide a combined safety handle and wrapper formed from a single sheet of material secured to the confection; to provide methods and means for attaching handles to plastic candy masses. Although the confections shown in Figs. 1-4 have been described as being formed of plastic candy masses, it is obvious that the various types of handle members shown could be attached to frozen confections by inserting the handle members in liquid mixtures held in suitable molds and subjecting to freezing temperatures. Various other modifications can obviously be made without departing from the spirit of my invention.

I claim:

1. A confection comprising a relatively solid edible body and a single sheet material member, said member having a portion embedded in said body, the inner portion extending away from said body so as to provide a handle therefor and the outer portion of sufficient size to form an enclosing wrapper for the body.

2. A confection comprising a relatively solid edible body, and a flexible sheet material member secured thereto, a central portion of said member serving as a handle for the confection, a portion of said member adjacent said first named portion being reversely directed, said second named portion being embedded in said body, and a third and outer portion of said member being directed around said body so as to form an enclosing wrapper therefor.

3. A confection comprising a relatively solid edible body and a sheet material member secured thereto, said member having a substantially tubular portion passing through said body and having one end extending outwardly to provide a handle therefor, the remaining part of said member extending from the other end of the tubular portion and thence around the body so as to provide an enclosing wrapper therefor.

GERHARD A. ELLESTAD.